Feb. 16, 1932.    J. W. MEADOWCROFT    1,845,029
AUTOGENOUS WELDING
Filed Jan. 12, 1924
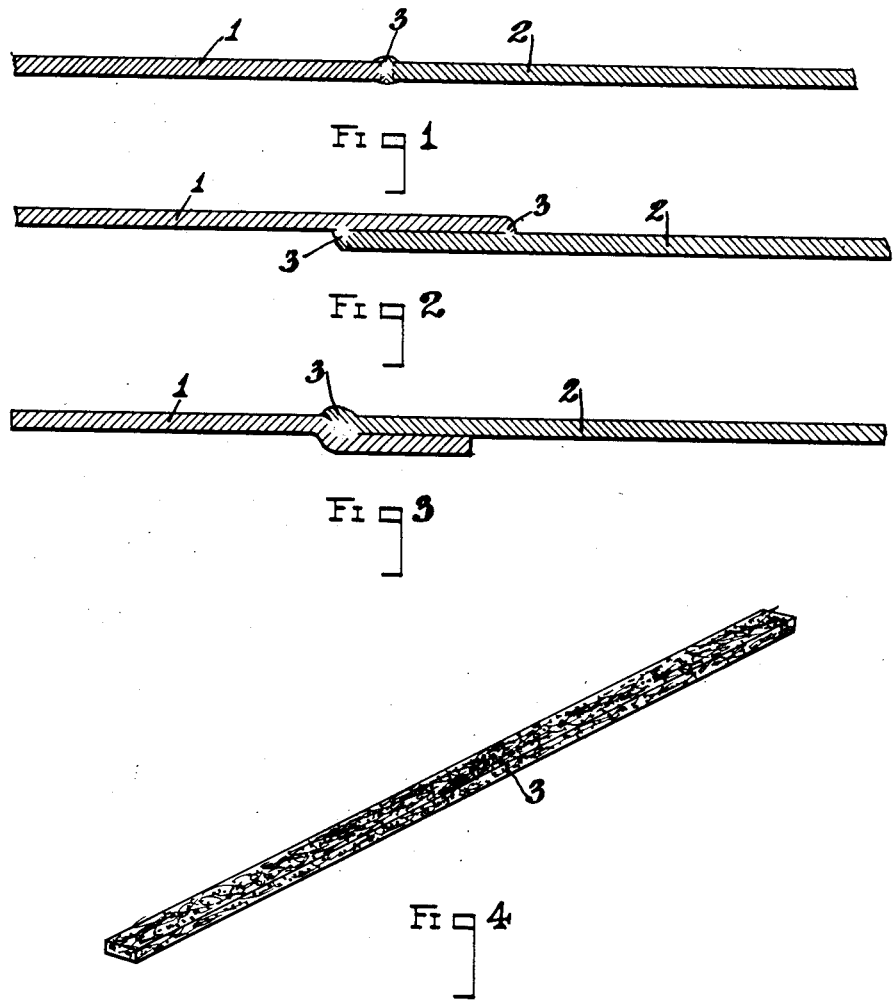
INVENTOR.
JOSEPH W. MEADOWCROFT.
BY
WITNESS:—

Patented Feb. 16, 1932

1,845,029

UNITED STATES PATENT OFFICE

JOSEPH W. MEADOWCROFT, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

AUTOGENOUS WELDING

Application January 12, 1924. Serial No. 685,731.

My invention relates to autogenous welding and more particularly to the autogenous welding of aluminum, duralumin and the like metals.

The object of the invention is to provide a method of autogenous welding of aluminum, duralumin, or like metals, which is simple, economical and efficient.

A further object is to provide a flux of such nature and character, which, when properly prepared, may be easily, readily and efficiently applied as a coating to a filler material or body, and which will adhere closely to such material or body and will permit such filler body to be handled freely without material damage to the flux coating, and to be kept indefinitely without material change in or impairment of the efficiency of the flux material.

A further object is to provide a flux of the nature referred to, which, when applied to and properly dried on a filler body will not readily absorb moisture.

A further object is to provide a method of autogenous welding of aluminum, duralumin, and like metals by which the welding operation may be carried on, and effected continuously without requiring successive interruptions to accomplish the welding of a seam or joint.

A further object is to provide a filler body of any desired shape or size encased within a coating of the flux, and which body may be produced from sheets, strips or scrap material of aluminum.

Other objects of the invention will appear more fully hereinafter.

The invention consists substantially in the filler body and flux mode of preparing and applying the same, all as will be more fully hereinafter set forth, and pointed out in the appended claims.

In the accompanying drawings—

Figs. 1, 2 and 3 are views in section showing various forms of joints in the welding of aluminum or duralumin parts together in accordance with my invention.

Fig. 4 is a view illustrating a form of filler body to which a coating of flux composition has been applied in accordance with my invention.

In the drawings, the parts to be welded are designated 1, and 2, respectively, and the coated rod or filler body is designated by the reference numeral 3. In effecting the welding, whether in a butt weld, as shown in Fig. 1, or in a lap weld, as shown in Figs. 2 and 3, the filler body or rod, treated and coated as hereinafter described, is placed at the joint to be welded, and then the treating flame from a torch, such as an oxy-acetylene or an oxy-hydrogen torch, is run continuously along the joint to effect the weld.

Many efforts have been directed towards the problem of welding together aluminum members, or duralumin members, but the methods heretofore proposed have not been satisfactory, and, moreover, they have been inefficient, slow and expensive.

In carrying out my invention I propose to employ a filler body of suitable material and of any desired shape, size or dimensions, which is encased within, or to which is applied, a thin coating of flux composition of such character and nature, and applied in such manner, as to adhere closely to the surface of the filler body, and which filler body, when so coated, may be carried in stock until required for use in effecting the welding together of sheets, casting bars, plates, wires or other members of aluminum, duralumin, or like metals.

A flux composition suitable for use in carrying out my invention, and which I have found in practice to be efficient, consists of the following ingredients in approximately the proportions stated, the proportions given being illustrative, and not to be regarded as limitations, and being based on the weight per pound of the flux composition to be produced:

|  | Per cent |
|---|---|
| Potassium carbonate | 3.00 |
| Potassium chloride | 3.70 |
| Lithium chloride | 6.90 |
| Potassium sulphate | 7.20 |
| Borax | 20.00 |
| Boracic acid | 21.00 |
| Sodium carbonate | 38.20 |

The ingredients of the flux composition are mixed together and the mixture reduced to a condition which enables it to freely mix with water so as to be brought to approximately the consistency of light cream, and it is then ready to be applied to the filler body. In preparing the flux I have found it convenient and satisfactory to grind the mixed ingredients for a sufficient length of time to reduce the mixture to a condition of smoothness. This may be accomplished by grinding the mixture in a rolling ball mill grinder or rumbler for a number of hours, say, for example, from fifteen to twenty hours, more or less, or by repeatedly grinding the mixture through a paint mixer. When the mixture has been reduced by the grinding operation to a degree of smoothness which permits it to mix freely with water, a sufficient quantity of water is added during a continuation of the grinding operation to bring the mixture to approximately the consistency of light cream. When brought to this condition of smoothness and consistency, it is ready to be applied to the filler body, and when such body, composed of aluminum, or duralumin, or like metal, is properly prepared and cleaned and then dipped into the flux composition, the latter will adhere closely to the filler body, and will not readily absorb moisture, nor will it be materially impaired by handling of the coated filler body, nor by lapse of time after application and before using the filler body coated therewith.

It will be noticed that I have not used in the combination of materials utilized for coating the filler body, any binder such for instance as is commonly employed as the several ingredients are sufficient in themselves to give proper adherence to the filler body and adhere tenaciously to said filler body without the addition of any non-weld-assisting binder.

For a filler body I have found it convenient and satisfactory to employ aluminum, or duralumin, and such body may be in the form of a rod, or it may be sheared or cut from a sheet of the metal stock, or scrap shearings from press blanks or shear trimmings may be employed. The filler body, whether in the form of a cast rod, or a strip of sheet or scrap material or shearing, may be of any desired size, shape or dimension. I have found in practice that it is efficient and satisfactory to employ a strip from a sheet or shearing or scrap of aluminum having a thickness of from .010 inch to .5 inch in thickness and a width ranging from one sixteenth inch to one inch.

I have found it desirable to cleanse the filler body before applying the flux composition coating thereto. This is especially necessary in the case of use of scrap material from press blanks, shearings, or the like, in order to remove any neutral or other oil that is usually applied to sheet metal in blanking and shearing operations. This cleansing of the filler body can be easily and efficiently accomplished with kerosene, gasolene, alcohol, benzol, or other hydrocarbon.

Before applying the flux coating to the filler body, I have found it desirable to reduce the surface of the filler body to a condition which will permit or enable the flux composition to take an immediate hold on such surface. To accomplish this I have found that it is convenient and efficient to dip the filler body, after it has been cleansed, as above described, where cleansing is required, into a hot solution of 15% caustic soda (lye) and water for about a minute, more or less, and then subjecting the body to a bath of clear cold water. This treatment serves to impart a bright finish to the surface of the strip to permit the flux composition to adhere at once to such surface when applied thereto, and to be indefinitely retained thereon.

After the filler body and flux composition have been prepared, as above described, the flux may be applied to the body in any suitable or convenient manner. I have found in practice that it is sufficient and efficient to dip the body into the flux composition. After dipping, the coating is dried by any suitable means. I have found it satisfactory to employ a cold air blast for this purpose.

I have found in practice that by utilizing some or all of the materials mentioned in the coating solution and bringing the same to the consistency of light cream, or substantially so, I obtain when the filler bodies are dipped either singly or otherwise into the solution a coating which is absolutely uniform throughout the surface of the body and is of sufficient thickness to overcome any irregularities in the absorptive power of the surface of the metal and which is not of sufficient thickness to produce an objectionable slag deposit in welding.

The filler body prepared and coated in the manner above described is now ready for use in effecting the autogeneous welding together of aluminum, duralumin, or the like metal parts, by the employment of an oxy-acetylene or an oxy-hydrogen flame. In effecting the welding operation, the operator is free to carry on his work without successive interruptions, thereby greatly increasing the speed. I have found that an increase in speed of approximately forty per cent is realized. By employing scrap material for the filler body a saving of approximately eighty per cent is effected, and there is no waste of the flux composition. In the actual use of this method of welding not only is the speed of the welding operation and, hence, the production, very greatly increased, but the production costs are lowered to the extent of approximately sixty per cent as compared with other methods of welding heretofore employed.

Having now set forth the objects and nature of my invention and the manner of carrying the same into operation, what I claim as new and useful and of my own invention and desire to secure by Letters Patent is—

1. A filler body for use in autogenous welding of metals of the aluminum group which consists of a piece of metal of that group carrying directly on the surface thereof and adherent thereto a coating of a flux of the following materials mixed in a water solution and dried on the piece of metal and in the following proportions by weight:

| | Per cent |
|---|---|
| Potassium carbonate | 3.00 |
| Potassium chloride | 3.70 |
| Lithium chloride | 6.90 |
| Potassium sulphate | 7.20 |
| Borax | 20.00 |
| Boracic acid | 21.00 |
| Sodium carbonate | 38.20 |

2. A filler body for use in autogenous welding of metals of the aluminum group which consists of a piece of metal of that group having its surface cleansed by the action of caustic and carrying directly on that cleansed surface a coating of a flux of the following materials mixed in a water solution and dried on the piece of metal and in the following proportions by weight:

| | Per cent |
|---|---|
| Potassium carbonate | 3.00 |
| Potassium chloride | 3.70 |
| Lithium chloride | 6.90 |
| Potassium sulphate | 7.20 |
| Borax | 20.00 |
| Boracic acid | 21.00 |
| Sodium carbonate | 38.20 |

3. A filler body for use in autogenous welding of metals of the aluminum group which consists of a piece of metal of that group carrying directly on the surface thereof and adherent thereto a coating of a flux consisting of the following materials mixed in a water solution in the consistency of light cream, and dried on the piece of metal, and in the following proportions by weight:

| | Per cent |
|---|---|
| Potassium carbonate | 3.00 |
| Potassium chloride | 3.70 |
| Lithium chloride | 6.90 |
| Potassium sulphate | 7.20 |
| Borax | 20.00 |
| Boracic acid | 21.00 |
| Sodium carbonate | 38.20 |

4. A filler body for use in autogenous welding of aluminum which consists of a piece of aluminum having a surface cleansed to enable a flux to take hold thereto and said cleansed surface carrying directly thereon a coating of a flux dried on the surface of the aluminum and consisting of the following materials and respective proportions by weight:

| | Per cent |
|---|---|
| Potassium carbonate | 3.00 |
| Potassium chloride | 3.70 |
| Lithium chloride | 6.90 |
| Potassium sulphate | 7.20 |
| Borax | 20.00 |
| Boracic acid | 21.00 |
| Sodium carbonate | 38.20 |

In testimony whereof, I affix my signature.

JOSEPH W. MEADOWCROFT.